United States Patent [19]
Coleman et al.

[11] Patent Number: 5,320,491
[45] Date of Patent: Jun. 14, 1994

[54] WIND TURBINE ROTOR AILERON

[75] Inventors: Clint Coleman; William T. Kurth, both of Warren, Vt.

[73] Assignee: Northern Power Systems, Inc., Moretown, Vt.

[21] Appl. No.: 911,215

[22] Filed: Jul. 9, 1992

[51] Int. Cl.⁵ .................................. F03D 7/04
[52] U.S. Cl. ........................ 416/24; 416/31; 416/44; 244/213
[58] Field of Search ............. 416/23, 24, DIG. 7, 416/DIG. 5, 31, 44; 244/213, 215, 216, 217

[56] References Cited

U.S. PATENT DOCUMENTS

| | | | |
|---|---|---|---|
| 2,617,487 | 11/1952 | Stalker | 416/23 |
| 2,622,686 | 12/1952 | Chevreau et al. | 416/23 |
| 3,128,466 | 4/1964 | Alvarez-Calderon | 416/23 |
| 4,025,230 | 5/1977 | Kastan | 416/31 |
| 4,181,275 | 1/1980 | Moelter et al. | 244/213 |
| 4,286,922 | 9/1981 | Lew | 416/24 |
| 4,297,076 | 10/1981 | Donham et al. | 416/24 |
| 4,349,169 | 9/1982 | McAnally | 244/213 |
| 4,445,421 | 5/1984 | Walker et al. | 416/31 |
| 4,462,753 | 7/1984 | Harner et al. | 416/44 A |
| 5,161,757 | 11/1992 | Large | 244/213 |

FOREIGN PATENT DOCUMENTS 0558045  12/1943  United Kingdom ................ 244/42

*Primary Examiner*—Edward K. Look
*Assistant Examiner*—Mark Sgantzos
*Attorney, Agent, or Firm*—Fish & Richardson

[57] ABSTRACT

A wind turbine has a rotor with at least one blade which has an aileron which is adjusted by an actuator. A hinge has two portions, one for mounting a stationary hinge arm to the blade, the other for coupling to the aileron actuator. Several types of hinges can be used, along with different actuators. The aileron is designed so that it has a constant chord with a number of identical subassemblies. The leading edge of the aileron has at least one curved portion so that the aileron does not vent over a certain range of angles, but vents if the position is outside the range. A cyclic actuator can be mounted to the aileron to adjust the position periodically. Generally, the aileron will be adjusted over a range related to the rotational position of the blade. A method for operating the cyclic assembly is also described.

35 Claims, 16 Drawing Sheets

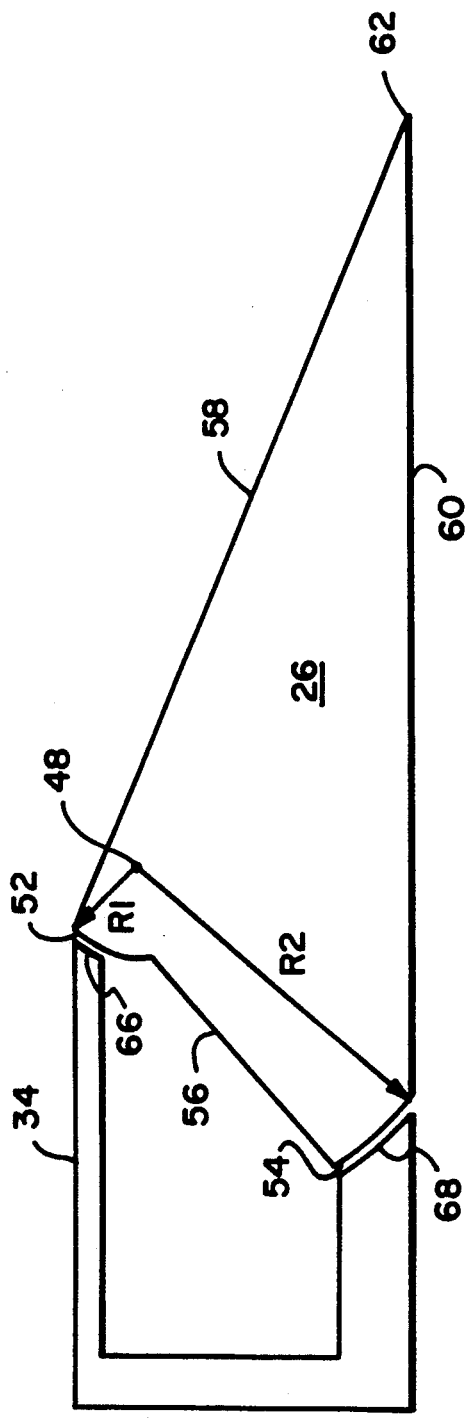
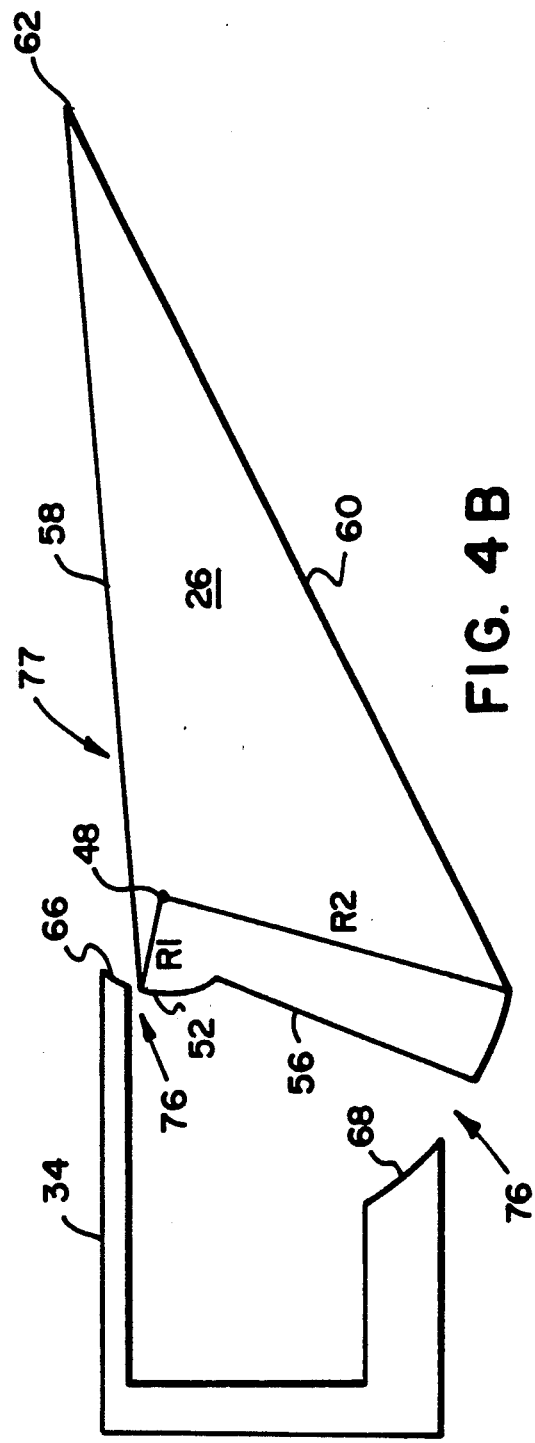

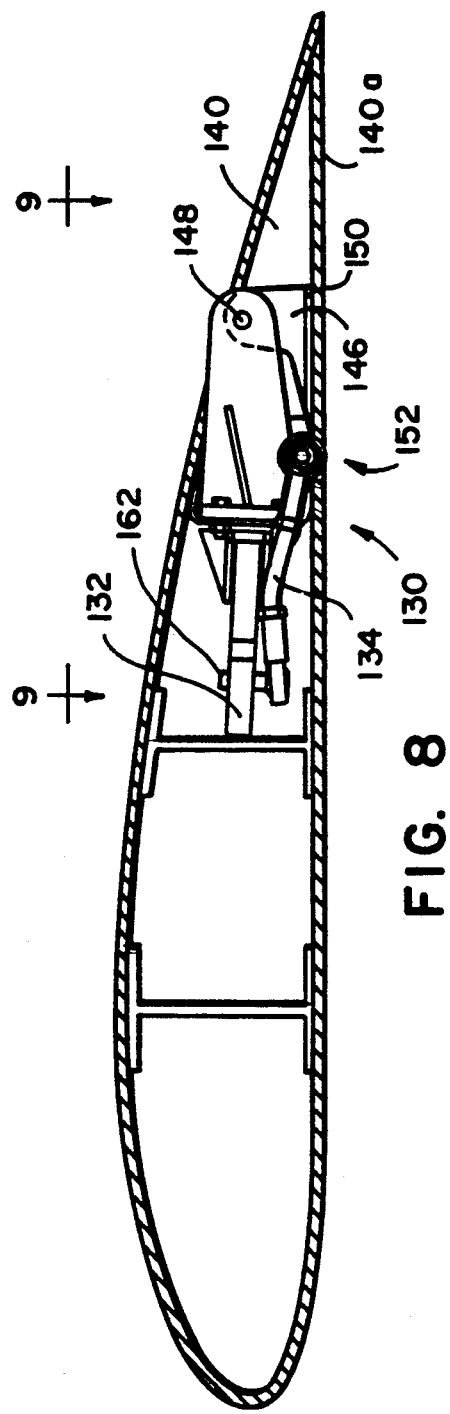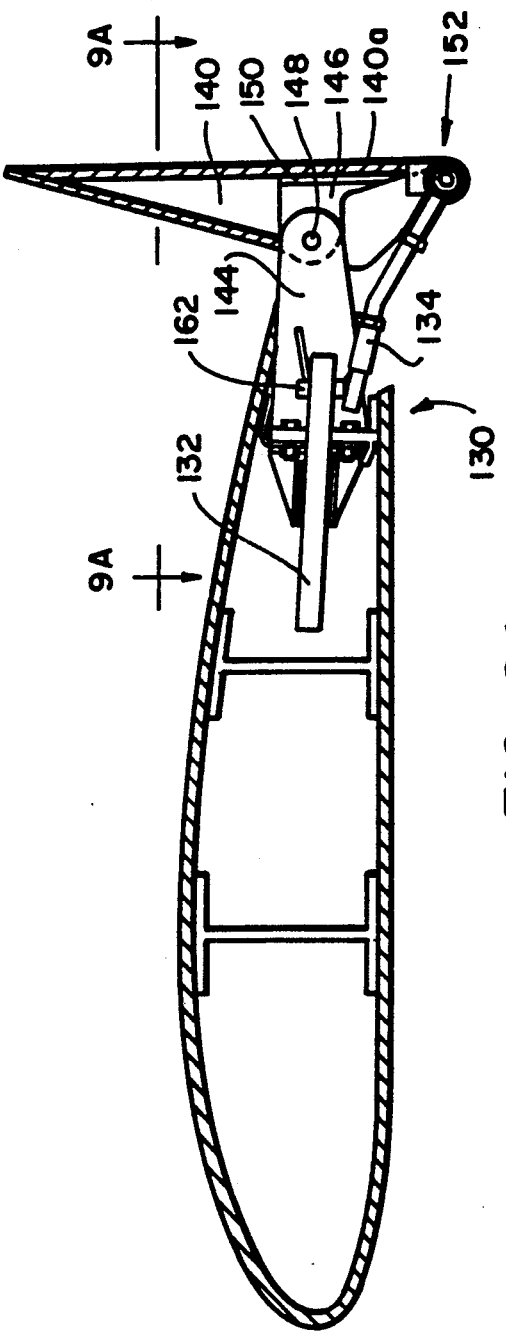
FIG. 8
FIG. 8A

WIND TURBINE ROTOR AILERON

STATEMENT AS TO FEDERALLY SPONSORED RESEARCH

The government has rights in this invention pursuant to Subcontract No. ZG-0-19090-2 awarded by the United States Department of Energy.

BACKGROUND OF THE INVENTION

This invention relates to rotor blades in wind turbines.

An aileron is one of several adjustable portions on the trailing edge of an airplane wing. Ailerons, spoilers, and flaps are employed to provide control surfaces to manipulate the flight of the airplane. Each of these devices is used on the aircraft in particular situations. Typically, ailerons are deployed through small angles to provide turning and rolling forces. Flaps are extended and lowered during takeoffs and landings to increase the wing surface area and to alter the lift of the wing.

Ailerons have also been investigated for use on rotor blades used on wind turbines. While there are some similarities between an aircraft wing and a rotor blade and some similar terminology is used, the rotor blade and the forces acting on the rotor blade are much different from the aircraft wing. An airplane is subject to two sets of opposing forces: gravity, lift, thrust, and drag. The adjustable ailerons, spoilers, and flaps, which change the relative pressure around the fixed position wing, are used to control motion vertically and in the direction of flight.

A rotor blade also has lift and drag characteristics, but the rotor does not have engines to provide thrust, and gravity acts much differently on a wind turbine rotor blade since a blade rotates in a plane nearly perpendicular to the ground. Since the blade rotates at a significant speed, centripetal acceleration is much greater than gravitational forces. Furthermore, due to the rotation, there are also other mechanical problems and twisting forces which are different from forces experienced by the fixed wing of an aircraft.

On a rotor blade, the aileron affects rotor torque and speed. This method of rotor control can be used as an alterative to blade pitch control, either full span or partial span. Ailerons have also been used in wind turbines as an alternative to tip drag brakes.

SUMMARY OF THE INVENTION

In one aspect, the invention features a wind turbine which has a rotor with an aileron, one of which is linked to an actuator assembly to adjust the position of the aileron.

In the preferred embodiments, the hinge includes two side walls and a single cavity, or three side walls and two cavities. Another hinge has a plate with two separate portions, one for mounting the actuator, and the other for coupling the blade.

One described actuator assembly includes a bell crank for converting the motion of an actuator linkage 90° to an aileron linkage. Another actuator has a threaded lead screw with a nut coupled to the aileron. Turning the screw causes the aileron to rotate with respect to the blade.

In another aspect, the invention features a method for controlling a wind turbine. The method includes monitoring the wind speed and adjusting the aileron to a certain position if the wind exceeds a predetermined speed. If the wind does not exceed the predetermined speed, the power level is monitored, and another position is selected if the power level is less than a predetermined threshold. In addition, the aileron can be set to be adjusted between the positions if the wind speed is less than the predetermined wind speed and the power is greater than the predetermined power level.

In another aspect, an aileron-equipped wind turbine has a rotor with a blade, which is twisted and tapered, while the aileron has a constant chord. Embodiments include an aileron with sub-assemblies which have substantially identical dimensions. These sub-assemblies are easier to produce than different sized assemblies, and allow fewer different parts.

In yet another aspect, the aileron has a leading edge with a curved portion for providing a range over which the aileron does not vent when actuated, i.e., the air flow does not pass between the aileron and the blade. When the aileron is actuated to an angle outside the range, the aileron vents. In one embodiment, the aileron has a curved portion with an arc of about 15°, so that the aileron does not vent over a 15° range.

In another aspect, the invention features a wind turbine comprising a rotor having a blade with an aileron, and a cyclic actuator for adjusting the aileron periodically as a function of blade rotation. In embodiments of the invention, the cyclic actuator is mounted to an actuator assembly, and comprises a wheel coupled to the actuator. The wheel turns once for every rotation of the rotor. The cyclic actuator has a range of adjustment smaller than the range of the actuator assembly. The cyclic actuator allows the wind turbine to be adjusted based on the angular position of the blade. This allows compensation for wind shear which causes the wind speed affecting the blade to be different at higher and lower elevations at the same site.

A method for controlling a wind turbine with a cyclic actuator is also featured. The rotational angular position is determined and the cyclic actuator is set accordingly. The loads on the blades are monitored to determine whether to continue using the cyclic actuator. This method provides for positioning the aileron, and for monitoring the effect of cyclic adjustment.

Other features and advantages of the invention will be apparent from the following description of preferred embodiments, and from the claims.

BRIEF DESCRIPTION OF THE DRAWINGS

FIGS. 4A and 4B are schematics of the aileron of FIG. 4 deployed at 0° and 25°.

FIGS. 8 and 8A are cross-sectional views of a rotor blade and aileron at 0 and −90 degrees, respectively.

DESCRIPTION OF THE PREFERRED EMBODIMENTS

Figure 1:
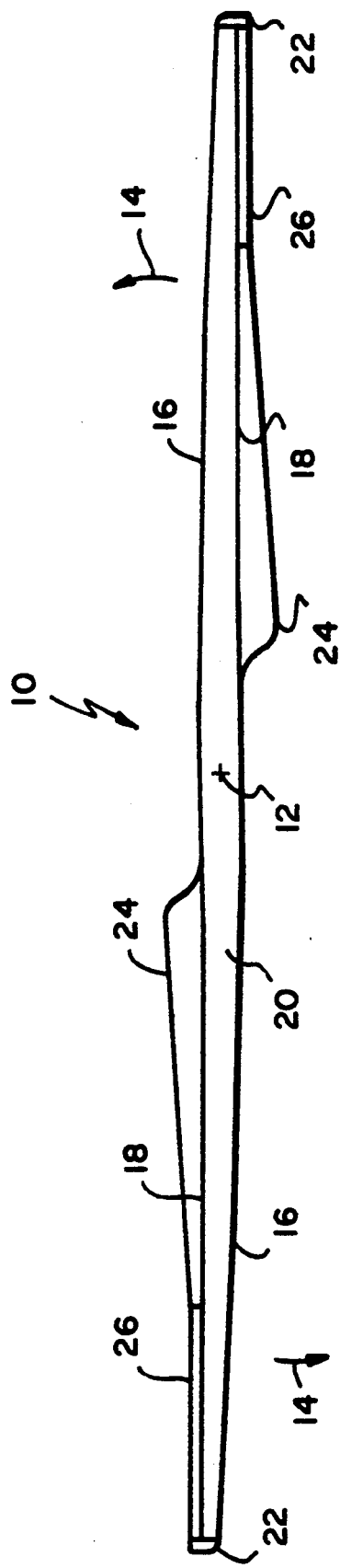
FIG. 1 is a plan view of a rotor blade assembly.

Referring to FIG. 1, rotor 10 is connected at center root 12 to a shaft which is journalled in a carriage on a tower (not shown) for rotation in the direction of arrows 14. The shaft, carriage, and tower are parts of a constant speed, upwind, two-bladed wind turbine which generates electricity for connection to an electrical utility grid. Rotor 10 has two blades with odd symmetry about root 12. Each blade has a leading edge 16 and a trailing edge 18. The backbone of the rotor 10 is a narrow, elongated multi-element beam 20 which tapers toward tips 22 bolted at either end of rotor 10. Mounted lengthwise against the trailing edges of beam 20 are aft body portions 24 and ailerons 26.

Figure 2:
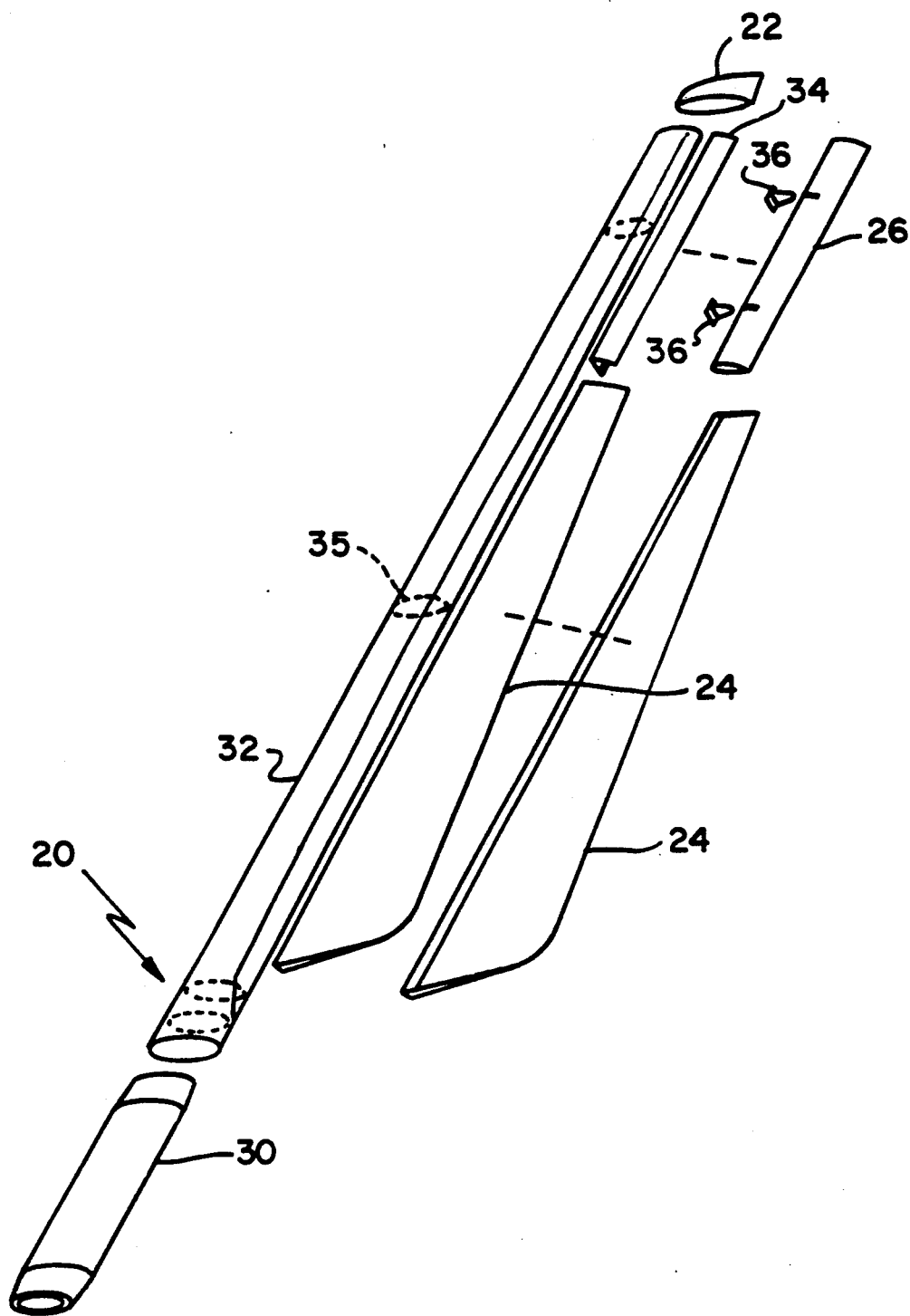
FIG. 2 is an exploded perspective view of half of the rotor blade assembly of FIG. 1.

Referring to the exploded view of FIG. 2, one of the two symmetric rotor blades is shown. The portion of the beam 20 forming one blade includes center portion 30 and spar 32. When assembled, center portion 30, spar 32, and the other spar (not shown in FIG. 2) form beam 20 extending from tip to tip. Aft body portions 24 are mounted lengthwise against spar 32 at the inboard end, i.e. closer to the rotational axis.

At the outboard end, cuff 34 is mounted lengthwise against spar 32. Aileron 26 is connected to cuff 34 with hinges 36. Each hinge is connected to the cuff, and one of the hinges is also connected to an actuation assembly (not shown) which adjusts the position of the aileron. The actuator could be connected to the inboard or outboard hinge. Because acceleration on the rotor can approach 40 g, generally it is preferable to keep control of components nearer the inboard end.

One type of hinge that may be employed is cast from 356 aluminum alloy and is fitted with light section spherical bearings 0.375 inches inner diameter, and 0.8125 inches outer diameter. Thrust load bearings in the hinge are high capacity, lubrication filled, and fiber reinforced at all supports.

Spar element 32 is constructed of Douglas fir wood/West epoxy laminations, center section 30 is a wood epoxy, and webs 35 are fabricated from aircraft-grade epoxy/plywood. These pieces are assembled by trimming and bonding to form a unitary skin stiffened structure a total of seventy feet long, and two feet wide by 1.1 feet thick at the hub, before the aft portions, ailerons, and tip portions are attached. Blade tips 22 are injection-molded, 40% glass-filled nylon and are mounted to the spar tip sections with bolts into threaded inserts. Inboard aft body moldings 24 are formed from 0.187 inches thick ABS sheet, thermo-formed to the desired contour and stiffened with 0.187 inches thick ribs every 10.0 inches to prevent buckling.

Figure 3:
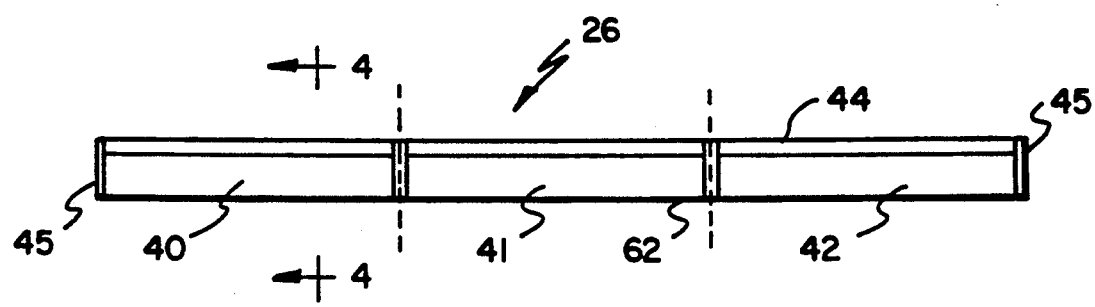
FIG. 3 is a plan view of an aileron.

Referring to FIG. 3, aileron 26 consists of three sub-assemblies 40–42 which have similar dimensions. Aileron 26 has a uniform cross-section and therefore constant chord, i.e. width perpendicular to the lengthwise direction of the rotor blade, and a length about 30% of blade span. At each end of the aileron are closing ribs 45. The three sub-assemblies of the aileron each consist of an upper and lower stiffened skin, having skin stiffeners spaced about five inches apart. The aileron is mass balanced with weight added continuously along leading edge 44, so that the center of gravity is close to the hinge line. This balancing reduces centrifugal and inertially induced control moments. Alternatively, the aileron can be a single structure having an upper and lower stiffened skin with a radial spar in the interior of the aileron. This design does not use a number of sub-assemblies.

The aileron can be constructed of compression-molded S-glass/epoxy, or injection-molded 40% glass reinforced nylon. Skin thickness is about 0.05 inches with injection molding. The nylon material is preferable because it is much lighter and less expensive, although with nylon, a tubular shaft is added to prevent excessive torsional windup. The S-glass/epoxy aileron is about five times as torsionally stiff, and therefore requires no shaft to limit windup. Since it is more expensive and heavier, however, it is less desirable.

Figure 4:
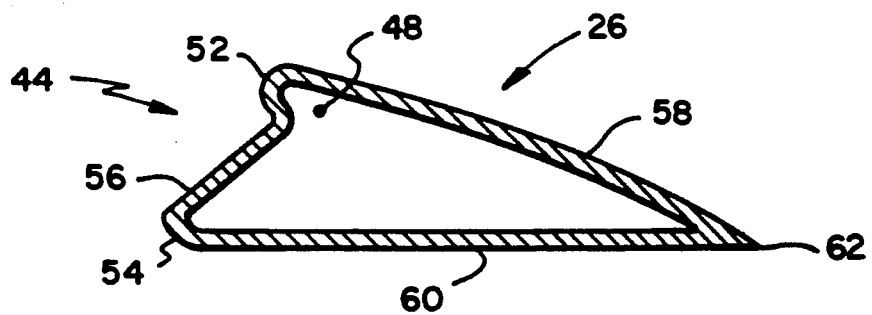
FIG. 4 is a cross-sectional view of the aileron of FIG. 3 taken through the plane 4—4 in the direction of the arrows in FIG. 3.

Referring to FIG. 4, the leading edge or nose 44 of the aileron includes two arc portions 52 and 54 and a straight portion 56. Top surface 58 and bottom surface 60 are flat, planar surfaces which converge to the trailing edge 62 of aileron 26. Referring to FIGS. 4A and 4B, arc portion 54 begins at bottom portion 60 and has an arc of about 10°–15° with a radius of curvature R2 with respect to hinge axis 48. Arc portion 52 begins at top portion 58 and has a smaller radius of curvature R1 with respect to hinge axis 48. Portions 52 and 54 are connected by straight portion 56. Alternatively, the straight portion can be an open section with ribs across the open section for support, while the lower portion is roughly L-shaped (see FIGS. 10 and 10A).

Aileron 26 is attached to cuff 34 by a hinge arm (not shown). Cuff 34 has surfaces 66 and 68 which mate with arc portions 52 and 54, respectively. As aileron 26 is rotated about hinge axis 48, it remains in contact with the cuff until it is rotated by an amount greater than the angle of arc 54.

Referring to FIG. 4B, aileron 26 is rotated about 25°. The aileron 26 separates from cuff 34 and air is able to flow through vent 76 between the aileron and the cuff. The vent reduces the lift coefficient of the rotor blade, especially if the vented airflow does not reattach above the top 77 of the aileron. The aileron and cuff are designed to keep the vented air from reattaching to the aileron, thus improving control behavior by limiting the peak lift coefficient, and by limiting stall hysteresis loop potential. These two effects cause the rotor system to operate more smoothly because the torque and bending loads have less variation.

Figure 5:
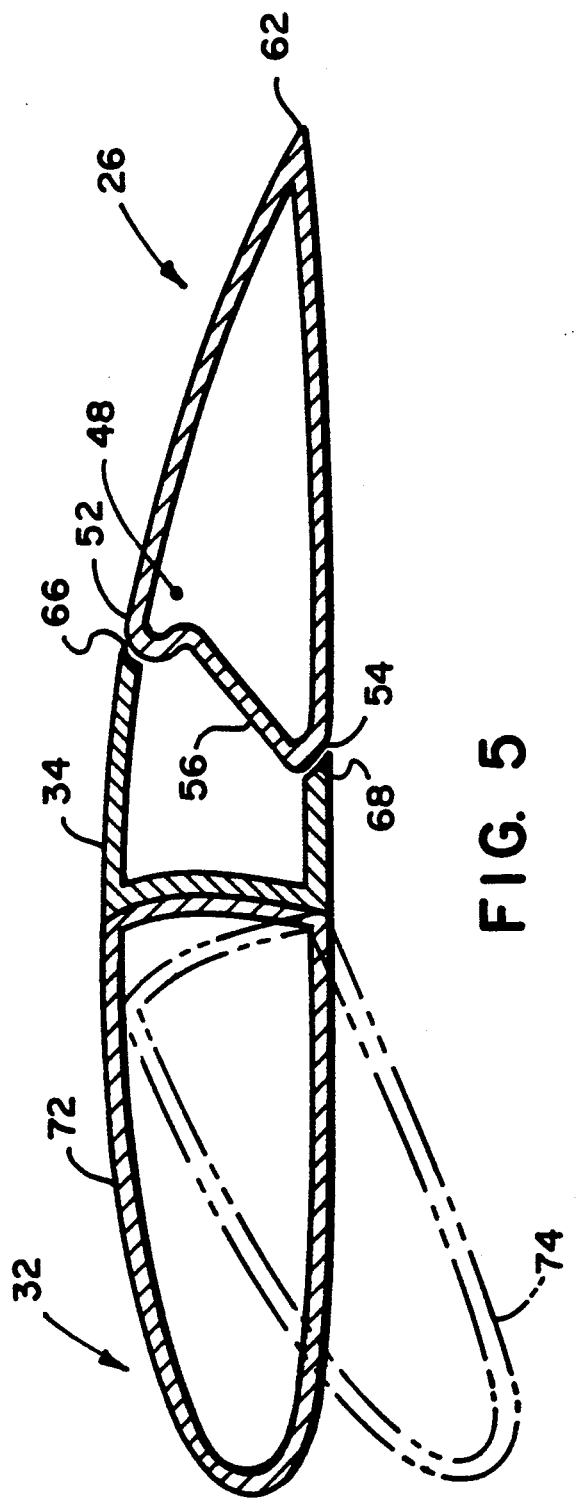
FIG. 5 is a cross-sectional view of the aileron and rotor blade, with superimposed views of the rotor blade at an inboard position (in phantom) and at the outboard end of the aileron/rotor blade assembly.

Referring to FIG. 5, cuff 34 is attached to spar 32 which is represented at 72 and 74. Tip section 72 and inboard section 74 represent the spar near the tip and at an inboard position. At relatively inboard section 74, the radius, with respect to the center root is 70% of the total. At this position, the chord of the blade is twenty-four inches, while at the tip it is sixteen inches. The aileron is a constant 6.5 inches, so the aileron measurement is 41% of the chord at tip section 72, and 27% of the chord at inboard section 74. At tip section 72, there is no twist, but at inboard section 74, there is a twist of about 2°.

Figure 6:
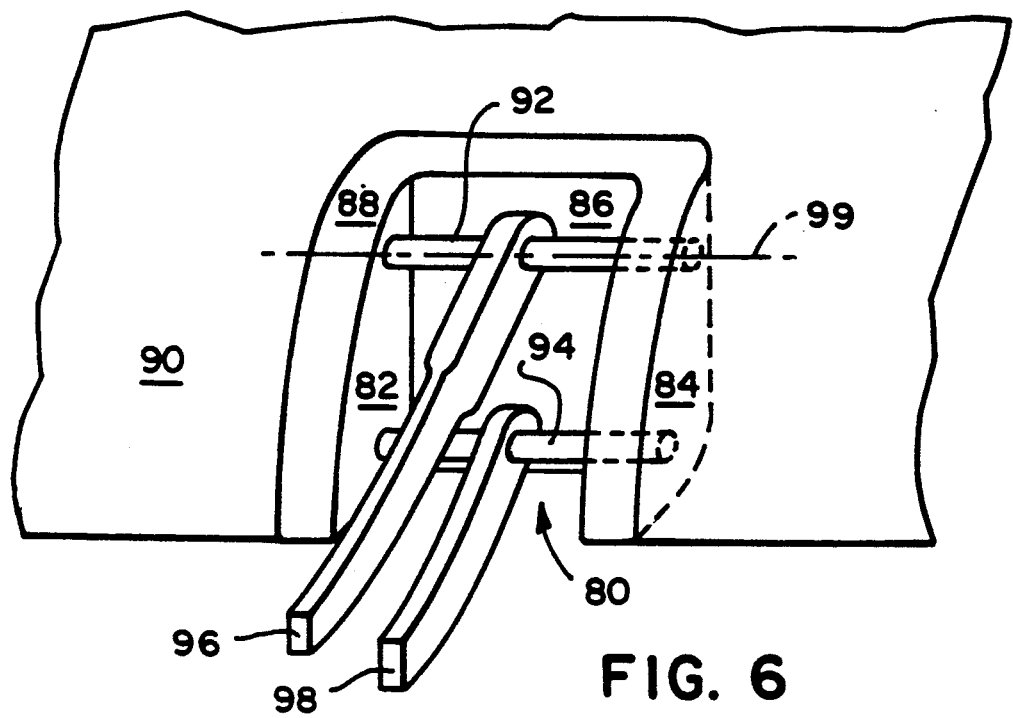
FIGS. 6 and 7 are perspective views of a single and double cavity hinge, respectively.

There are several embodiments of the hinge which connects the aileron to the cuff. Referring to FIG. 6, single cavity hinge 80 is a casting having side walls 82 and 84, and rear wall 86, which in combination form a U-shaped cross-section. Top edge 88 which is along the thickness of the hinge is shaped to conform to the curvature of aileron surface 90, as shown in FIG. 6. Extending across the cavity from one side wall to the other are trunnions 92 and 94. Stationary hinge arm 96 connects top trunnion 92 to the cuff and spar (see FIGS. 8 and 10). Actuator arm 98 connects bottom trunnion 94 and an actuator assembly (not shown). As actuator arm 98 is pushed or pulled by the actuator assembly, aileron 90 rotates about hinge axis 99 through top trunnion 92.

Figure 7:
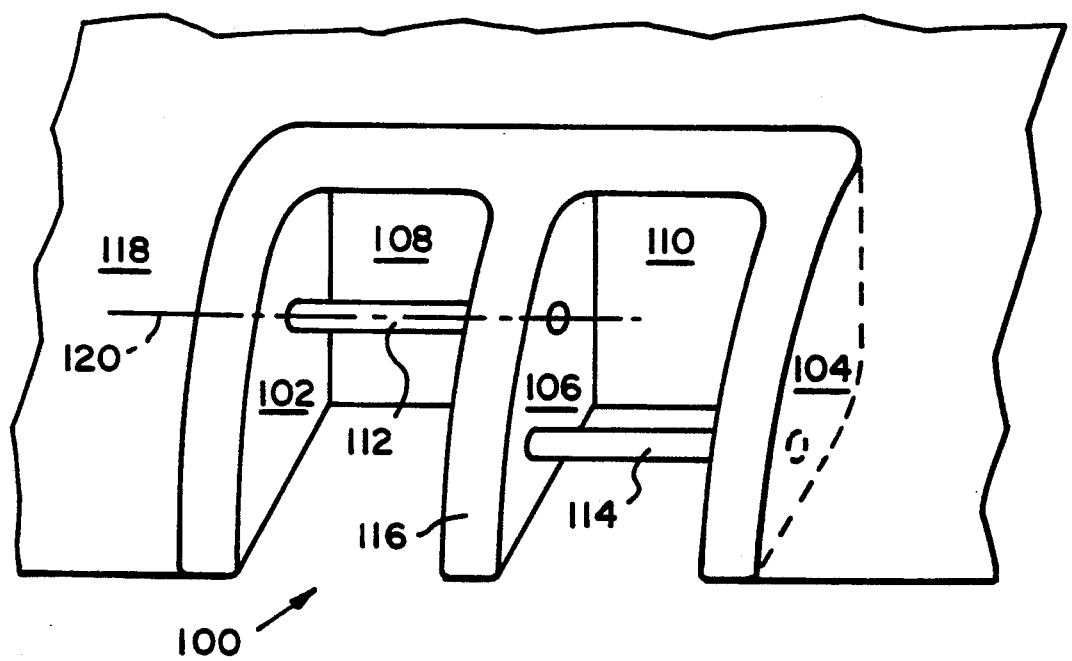

Referring to FIG. 7, another embodiment is a double cavity mount 100 which is a casting having side walls 102 and 104, center wall 106, and rear walls 108 and 110 which form a W-shaped cross-section. Surface 116 along the thickness of mount 100 is shaped to conform to the curvature of aileron surface 118. Similar to the single cavity mount of FIG. 6, top trunnion 112 is connected to a hinge arm (not shown), and bottom trunnion 114 is connected to an actuator arm (not shown). As the actuator arm pushes or pulls trunnion 114, the aileron rotates about hinge axis 120.

A third embodiment is the double hinge mounting design. FIGS. 8 and 8A show a bell crank actuator assembly 130 with aileron deployed at 0° and −90°, respectively. Assembly 130 has an activation linkage 138 (FIG. 9) which rotates bell crank 132, causing aileron linkage 134 to push aileron 140 into a deployed position.

Figure 9:
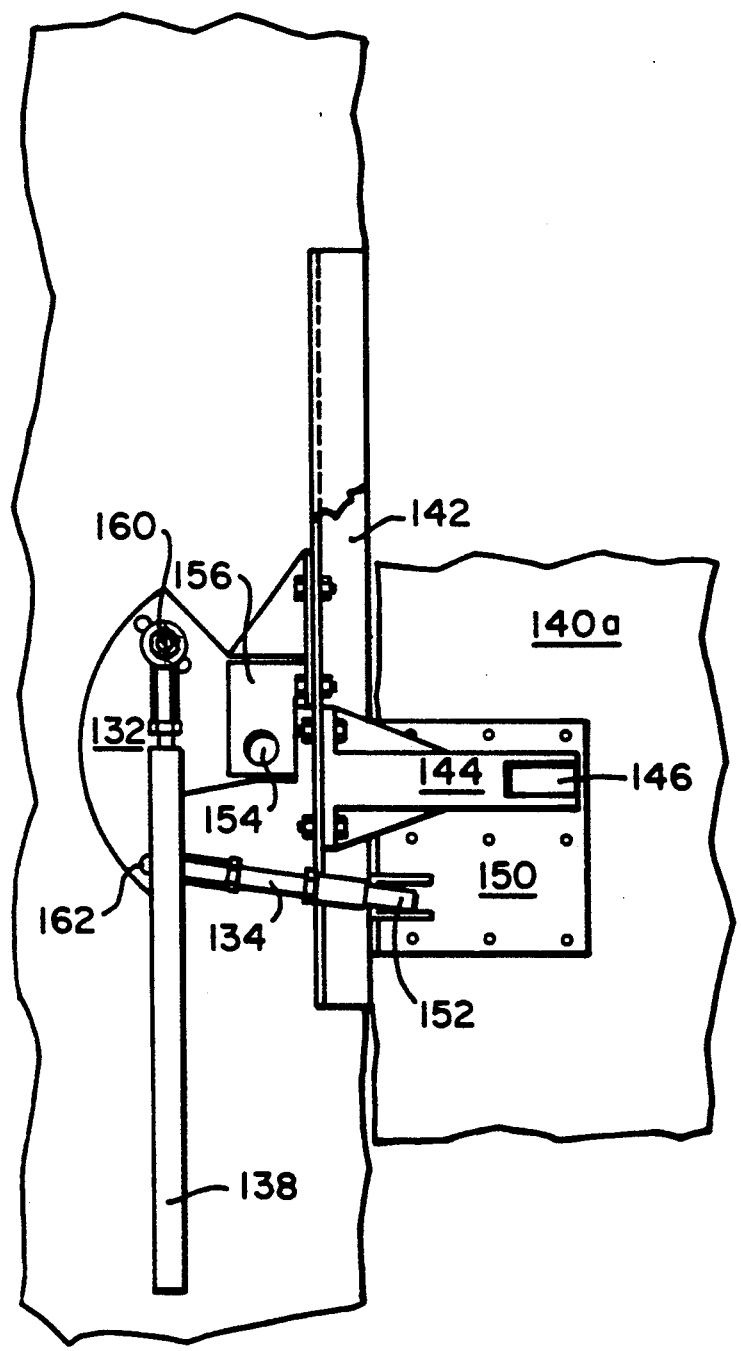
FIGS. 9 and 9A are top views of the actuator assembly of FIGS. 8 and 8A (with portions removed) in the direction indicated by the respective arrows in FIGS. 8 and 8A.
Figure 9A:
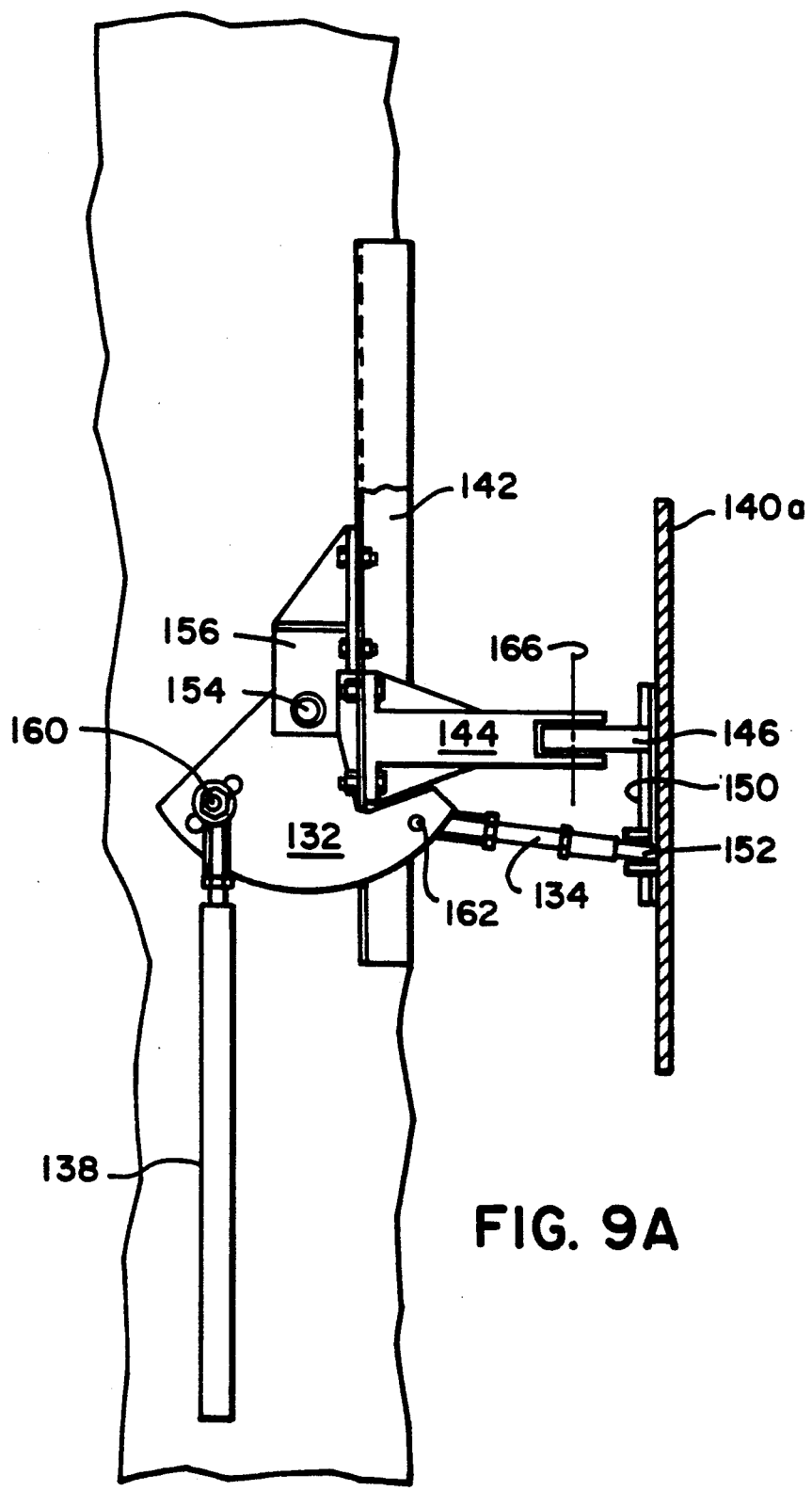

Referring in addition to FIGS. 9 and 9A, portions such as the rotor blade have been removed so that the bell crank can be viewed. Rotor blade mount 142 is connected to aileron 140 by stationary hinge arm 144. At the end of arm 144 is a U-shaped cavity with trunnion 148 (FIG. 8). Over this trunnion, arm 146 connects hinge arm 144 to plate 150, which is bolted to lower aileron surface 140a. Plate 150 also includes an aileron linkage hinge 152 which connects aileron 140 to bell crank 132 with an aileron linkage 134. Bell crank 132 is roughly a quarter sector plate (with a portion removed), which transfers motion 90° from the actuator linkage to the aileron linkage. Bell crank 132 has an axle 154 which extends through a bearing in bracket 156 attached to rotor blade mount 142. Actuator linkage 138 extends lengthwise along the rotor blade and is pivotally connected to one end of bell crank 132 by joint 160 which is at the relatively outboard end of the arc portion of the bell crank plate. Aileron linkage 134 is connected with pin 162 on the bottom side of the bell crank at the relatively inboard end of the arc portion of bell crank 132.

To deploy aileron 140 to a −90° position, as shown in FIGS. 8A and 9A, actuation linkage 138 (FIG. 9) is pulled, causing bell crank 132 to rotate 90°, and thus to push aileron linkage 134. Pushing aileron linkage 134 causes the aileron to pivot about hinge line 166 at trunnion 148. An aileron is deployed to −90° typically in order to use the aileron as a brake.

Figure 10:
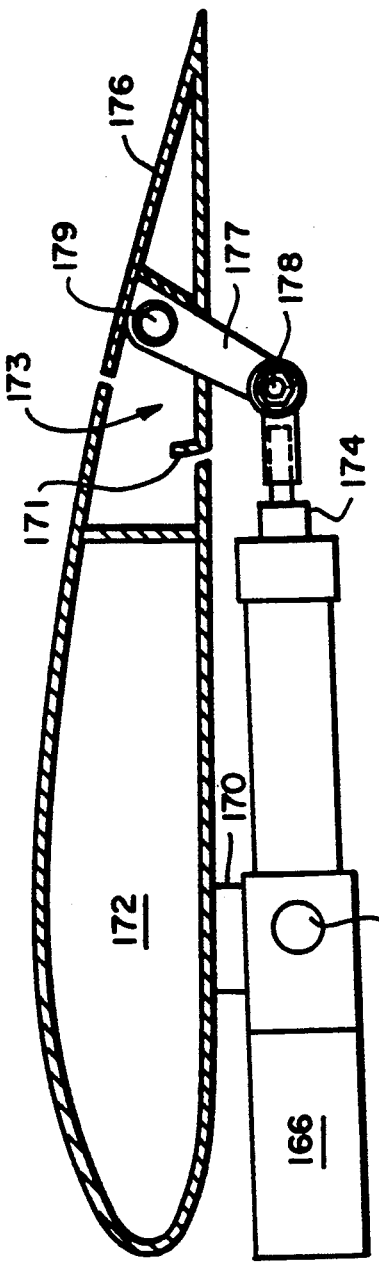
FIGS. 10 and 10A are partial cross-sectional side views of a rotor blade and aileron with external actuator.
Figure 10A:
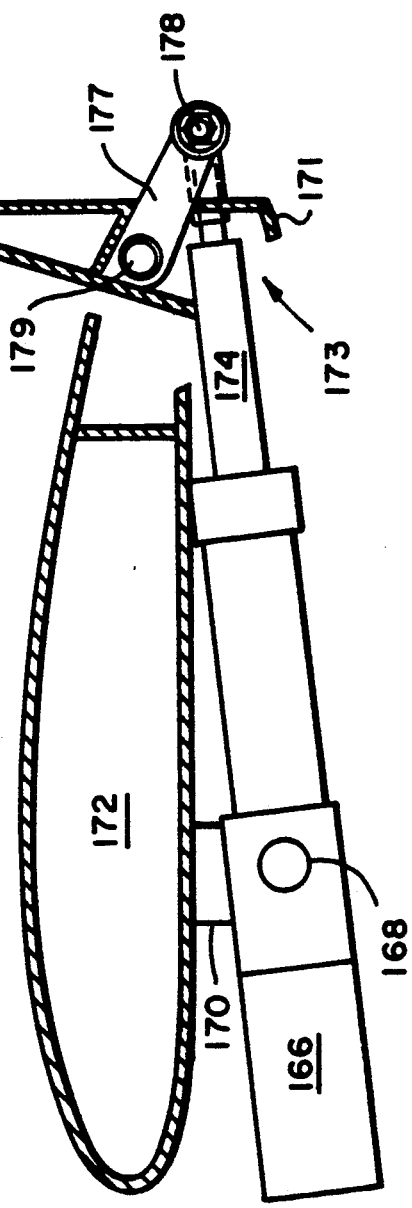

Referring to FIGS. 10 and 10A, another embodiment of an actuator is shown with the actuator mounted external to the blade. Actuator 166 is pivotally connected at trunnion 168 to a bracket 170 which is rigidly coupled to the lower portion of rotor blade 172. Actuator arm 174 is extended to push the pivot 178 which is coupled to hinge 179 by linkage 177. This causes aileron 176 to be deployed (FIG. 10A). As the actuator arm extends, the actuator rotates slightly about trunnion 168. Hinge 179 may be a single cavity hinge, as shown in FIG. 6. Aileron 176 has an L-shaped lower portion 171, and an open section 173 between the upper and lower portions of the aileron. Support ribs (not shown) can connect the upper and lower portions of the aileron across open section 173.

An actuator with multiple set point capability, feedback control, and an algorithm to determine the correct aileron position is desirable to compensate for problems which affect the rotor. Rotor performance can decrease when the leading edge of the blade becomes soiled with bugs or other foreign matter. If rotor performance deteriorates, the aileron can be deployed to gain back loss of lift associated with the bug or dirt accumulation on the leading edge. Some turbines have poor starting performance due to rotor layout and gear box friction. The aileron can be deployed at a negative angle to improve the starting torque of the rotor. Finally, the aileron can be controlled to enhance the performance of the rotor at low wind speed and high tip speed ratios. Deploying the aileron to a small negative angle can reduce the lift coefficient at the tip of the blade.

Figure 11:
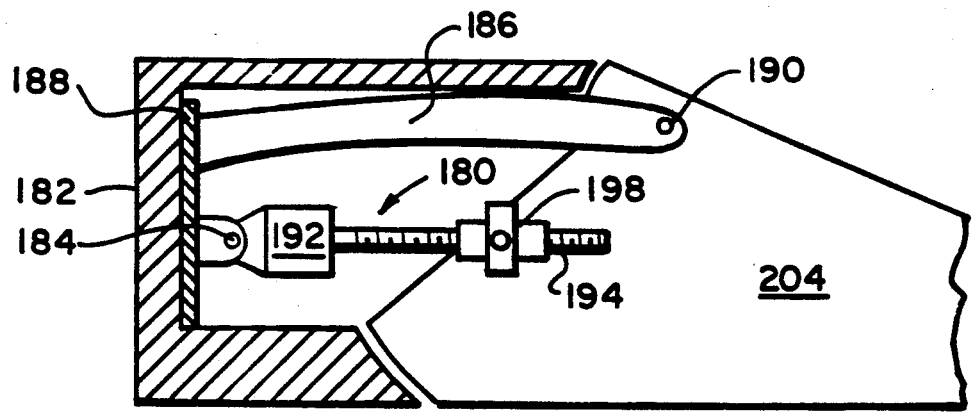
FIG. 11 is a side view of the ball screw assembly and aileron.
Figure 12:
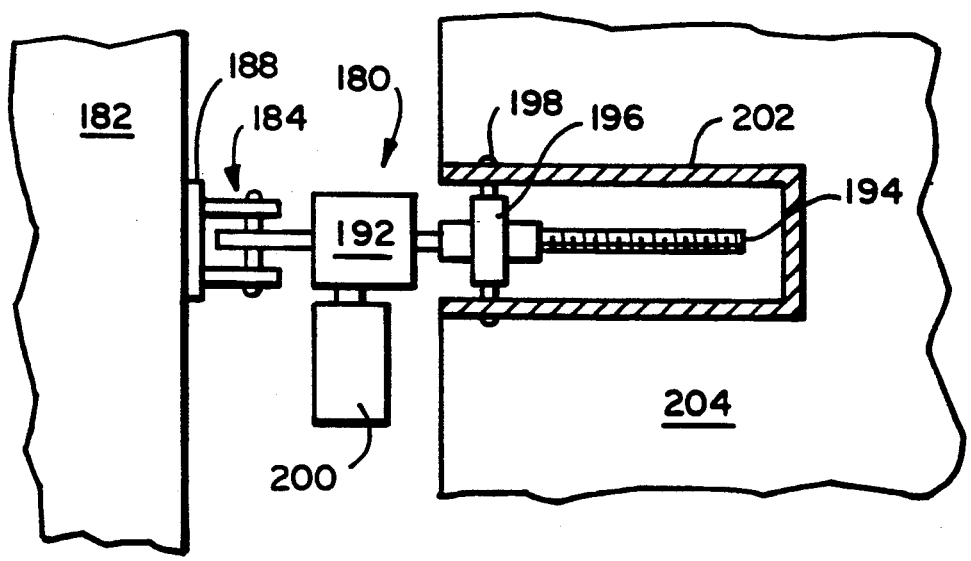
FIG. 12 is a top view of the ball screw assembly and aileron of FIG. 10 with portions removed.
Figure 13:
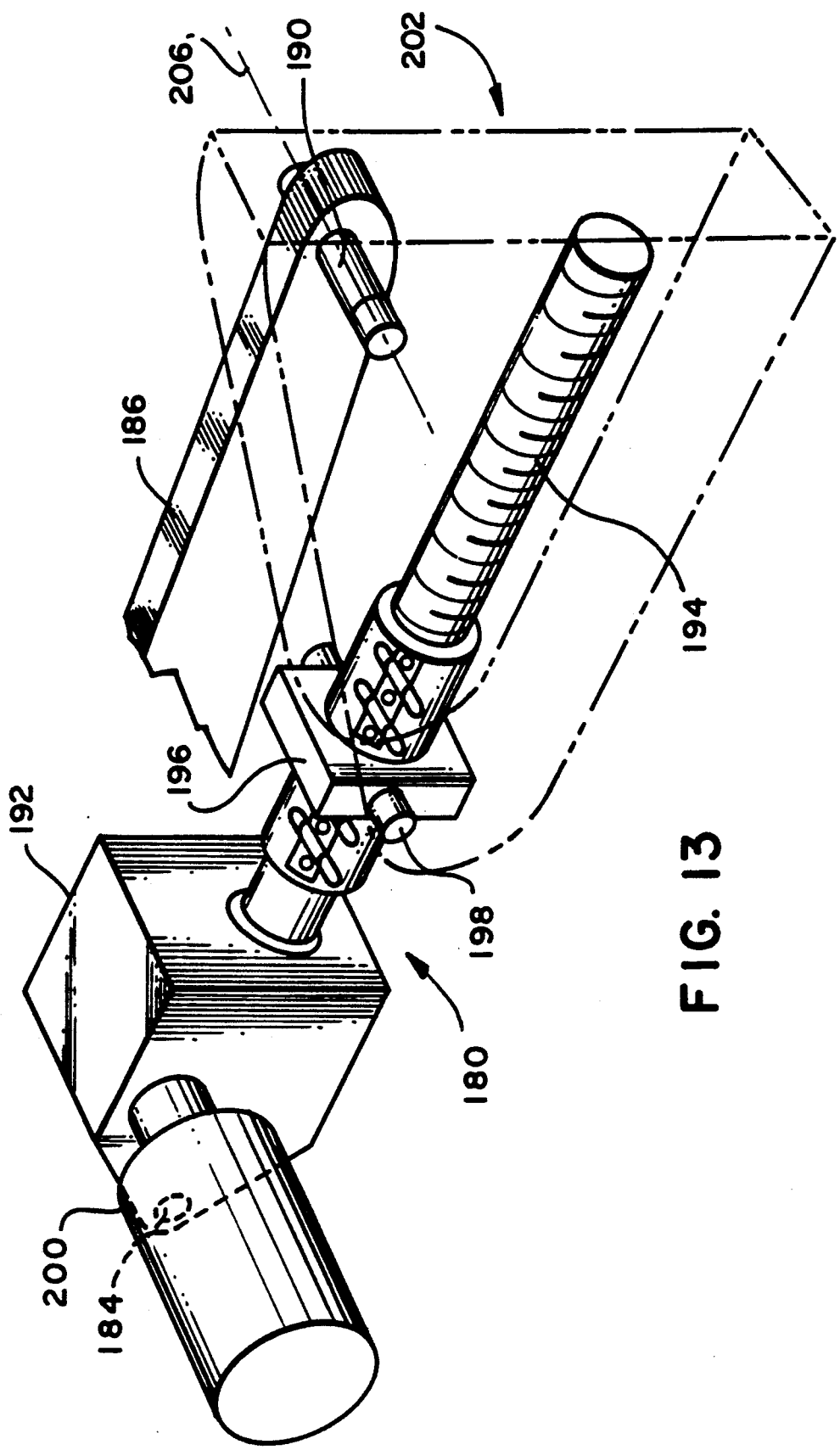
FIG. 13 is a perspective view of the ball screw assembly and a single cavity hinge.

Another embodiment of an actuator assembly is the direct acting ball screw assembly. As shown in FIGS. 11–13, ball screw assembly 180 is connected to cuff 182 by bracket 184. Hinge arm 186 is an elongated portion extending from blade mount 188 to trunnion 190 which is part of the hinge. Hinge arm 186 is stationary so that the aileron rotates about an axis through trunnion 190 when ball screw assembly 180 adjusts the aileron.

Ball screw assembly 180 has a speed reducer 192 which drives lead screw 194 through nut 196. Nut 196 is mounted on trunnion 198 within hinge 202 (FIG. 12). The screw can turn within the nut with direct contact, or recirculating balls or ball bearings are used between the screw and the nut. Referring to FIG. 12, speed reducer 192 is driven by DC motor 200.

Referring to the overall perspective of FIG. 13, hinge 202 is a single cavity mount, such as that described in FIG. 6. Hinge axis 206 runs through top trunnion 190 which is connected by hinge arm 186 to the cuff (not shown). As motor 200 drives speed reducer 192, lead screw 194 turns, effectively advancing or retracting nut 196 which is mounted to trunnion 198. Ball screw assembly 180 allows small changes to be made to the aileron position.

As mentioned previously, the rotor blade can be seventy feet or more from tip to tip. With such a length, when the rotor blade is perpendicular to the ground, the wind speed at the top blade may be significantly higher than the wind speed at the bottom blade. The difference in speed is termed wind shear. The severity of wind shear depends on atmospheric stability, wind speed, and upward currents. Wind shear can thus cause uneven loading on the blades.

Figure 14:
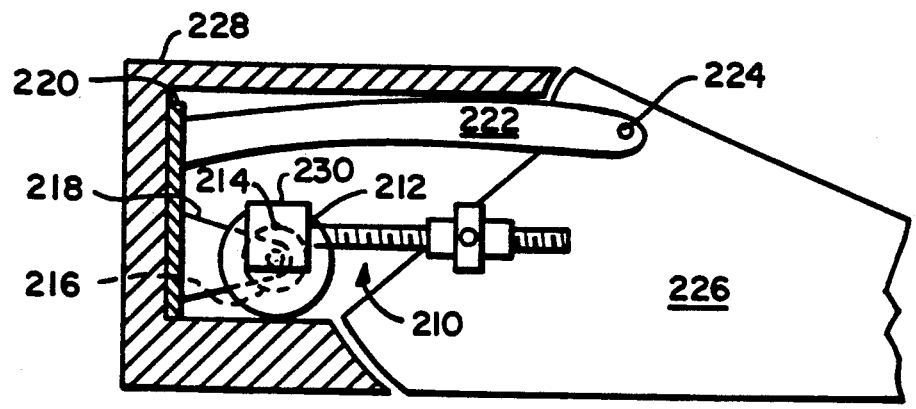
FIG. 14 is a side view of the ball screw actuator and aileron, with the ball screw actuator mounted on a cyclical wheel assembly.

In order to counteract the effects of wind shear, an actuator assembly, such as the ball screw assembly is mounted on a cyclical or oscillating device to adjust the position of the aileron as the rotor blade rotates. Referring to FIG. 14, ball screw assembly 210 is mounted on a rotating wheel 212 at point 214, thus tracing a circular pattern 216. Wheel 212 is connected to blade mounting 220 by a bracket 218. Similar to FIG. 11, hinge arm 222 couples trunnion 224 and blade mounting 220 which is connected to cuff 228. Wheel 212 and speed reducer 230 are each driven by motors (not shown). The wheel causes the aileron to be cycled through a relatively small range of angles, such as 5°, during each revolution of the wheel. Since the rotor is part of a constant speed wind turbine, the motor (not shown) which drives wheel 212 has to be synchronized to the speed of the rotor under general operating conditions. Frequency, therefore, is not a significant concern, but phase must be considered to synchronize the lower lift coefficient with higher wind velocity at the top.

Figure 15:
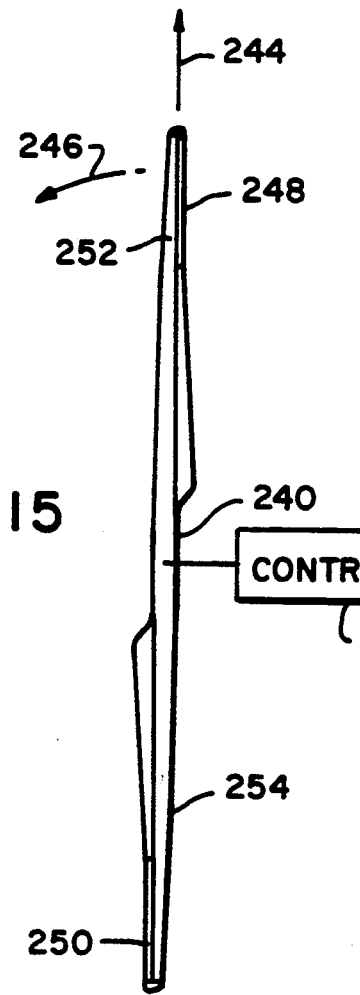
FIGS. 15 and 16 are plan views of the rotor blade assembly of FIG. 1 in vertical and horizontal positions.
Figure 16:
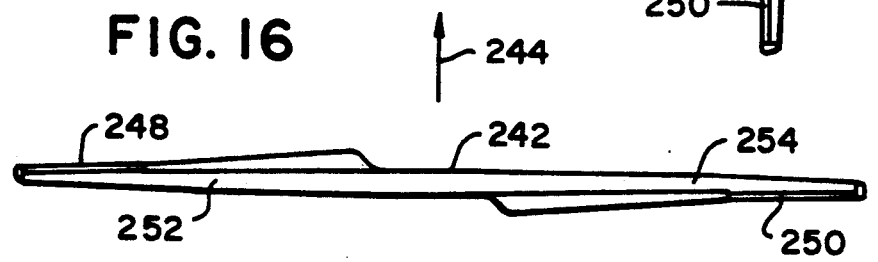

Referring to FIGS. 15 and 16, rotor blades 240 and 242 are shown in vertical and horizontal positions, respectively. Arrow 244 indicates the upward direction with respect to the ground. The rotor angle of rotor blade 240 with respect to the vertical position is referred to as the azimuthal position. For the rotor in FIG. 15 which is perpendicular to the ground, vertically higher blade portion 252 with aileron 248 is at 0°, and lower blade portion 254 with aileron 250 is at 180°. In FIG. 16, in which the rotor is parallel to the ground, the azimuthal position of each blade portion is advanced 90°. Since the wind has greater variation from top to bottom, ailerons 248 and 250 would be set at the minimum and maximum cyclical variations when the rotor is perpendicular to the ground, i.e. at 0° or 180°. When the rotor is parallel to the ground, the cyclic position of each aileron would be equal. Thus on a two-bladed rotor, the cyclic controllers would be 180° out of phase and on a three-bladed rotor, they would be 120° out of phase with each other.

Figure 17:
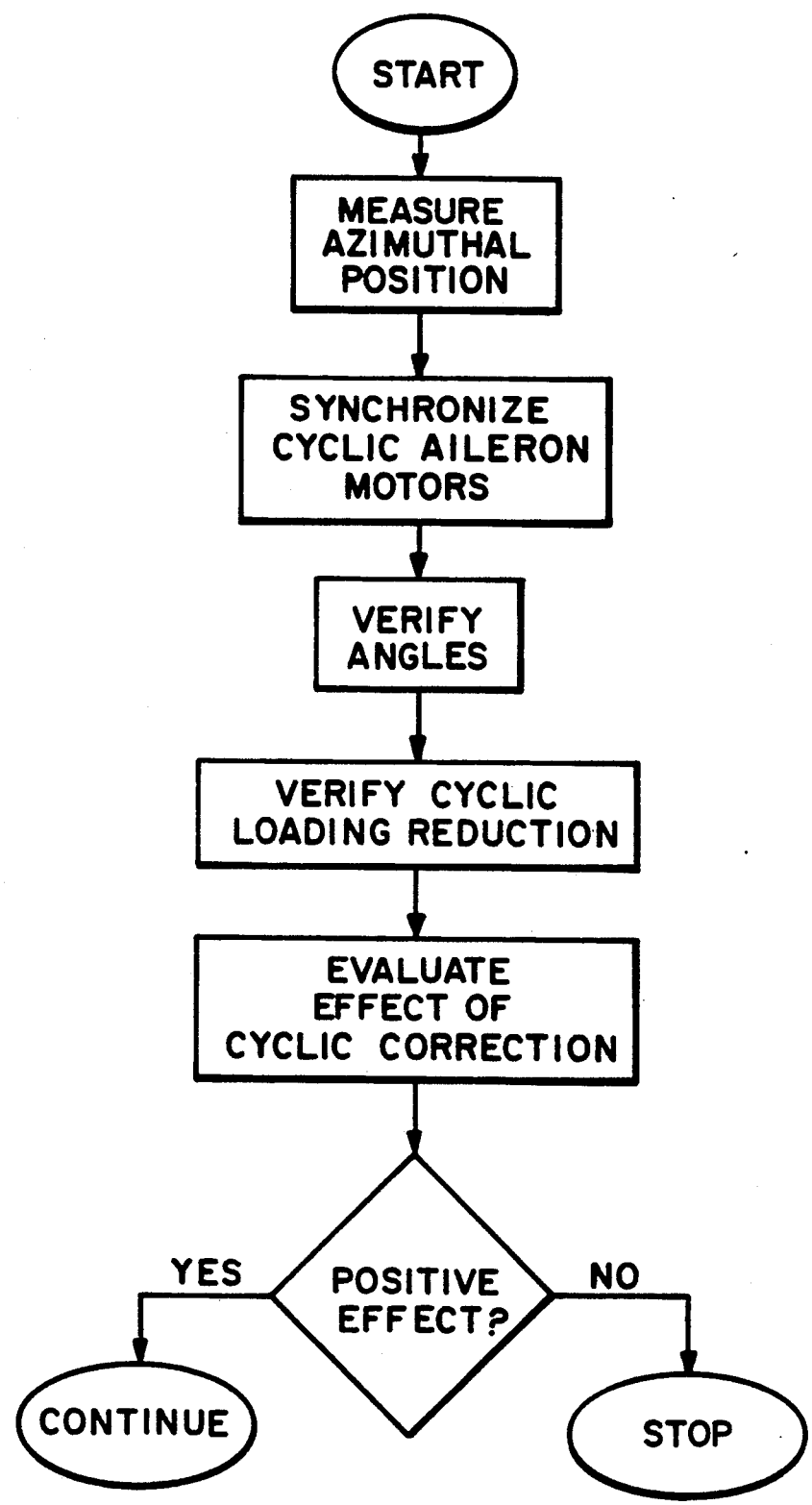
FIG. 17 is a flow chart of the control method for cyclical control.

Referring to FIG. 17, controller 260 (FIG. 15) performs a series of steps to set up and evaluate the effects of cyclic control. The controller measures azimuthal position and synchronizes the cyclic aileron motors so that the ailerons are at the same position when parallel to the ground (FIG. 16) and at a minimum and maximum when perpendicular (FIG. 15). The controller checks to verify the angles. Now that the cyclic actuator is properly synchronized, the controller checks measurement of loading with respect to the azimuthal angles, and evaluates the effects of cyclic actuation. The controller receives information from sensors, such as strain gauges, which can be positioned at a location on the blade or at the root. The controller determines whether cyclic actuation has reduced the loading on the blades. Depending on this determination, the controller continues or stops the cyclic adjustment. The cyclic actuator can therefore reduce the loading and the fatigue of the blades, thus enhancing the long term performance of the blades.

Note that cyclic control is independent of the position of the aileron otherwise, i.e., if the cyclic adjustment is from 0°--5°, the actual range may be from 25°-30° if the aileron is set initially at 25°. Thus the position of the aileron has a relatively fixed component and a cyclic component.

Figure 18:
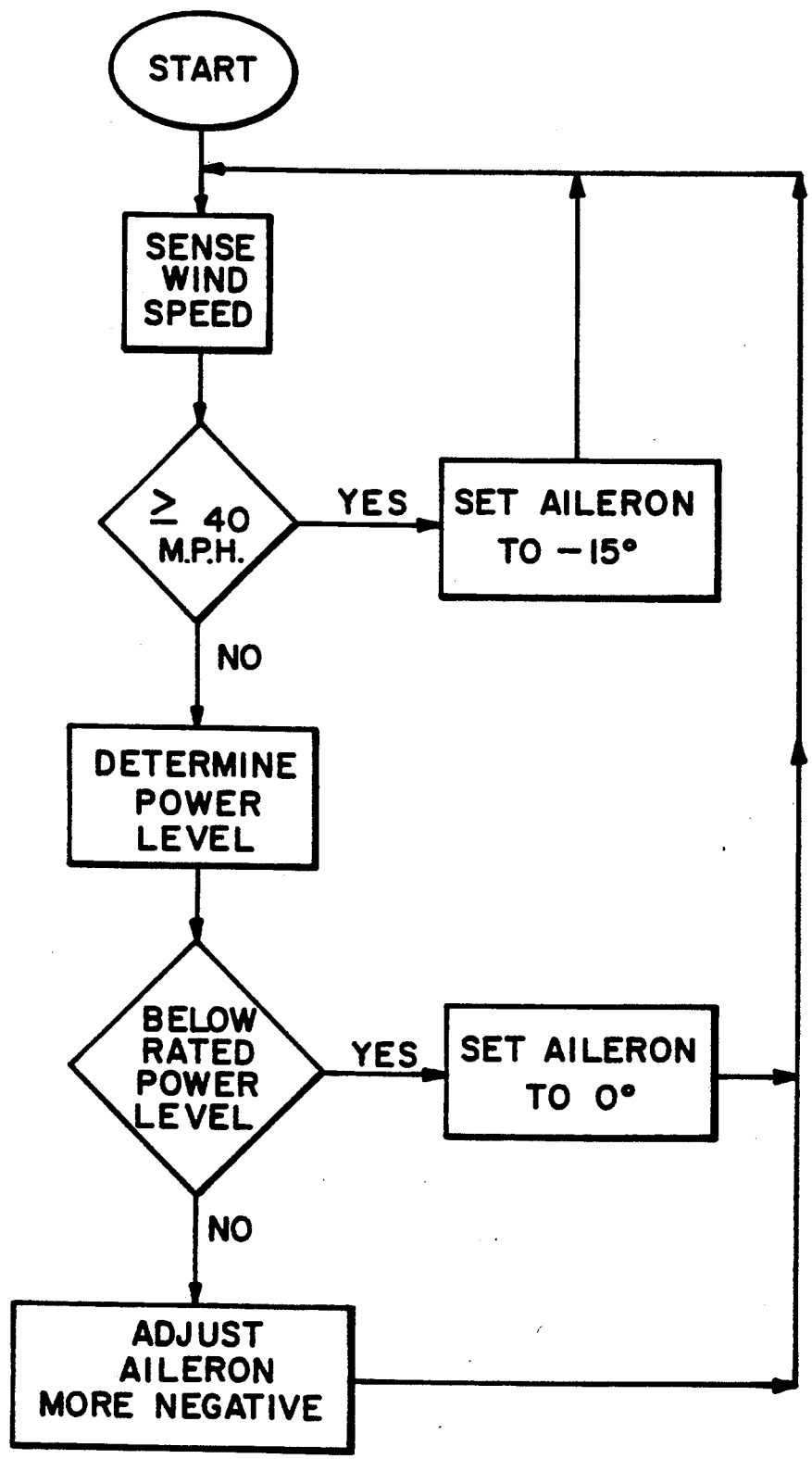
FIG. 18 is a flow chart of the control system to set the aileron position.
Figure 19:
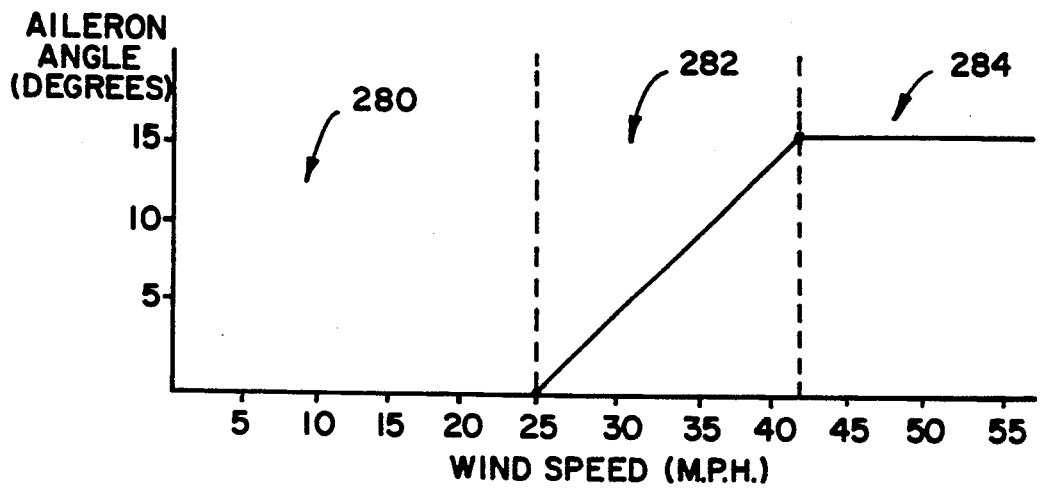
FIG. 19 is a graph of wind speed versus aileron angle.

The initial aileron position is determined at least in part by wind speed and power level. Referring to FIG. 18, controller 260 (FIG. 15) includes a wind speed sensor which determines wind speed. If it is determined that the wind speed is greater than 40 m.p.h., then the aileron is set to −15°. If not, the controller determines the power level. If the power level is less than a rated power level, i.e., a predetermined level set below the maximum power level, the aileron is set to 0°. Otherwise, the aileron is adjusted to more negative in order to reduce the power level. Therefore, referring to FIG. 19, the aileron is operated in three basic regimes. In first regime 280, the aileron is set at a lower angle for a low wind speed; in second regime 282, when the wind speed is greater than this lower value, the aileron angle increases linearly from the lower angle; and in third regime 284, the increase of the second regime stops and the aileron is maintained at a constant level for higher wind speed.

Figure 20:
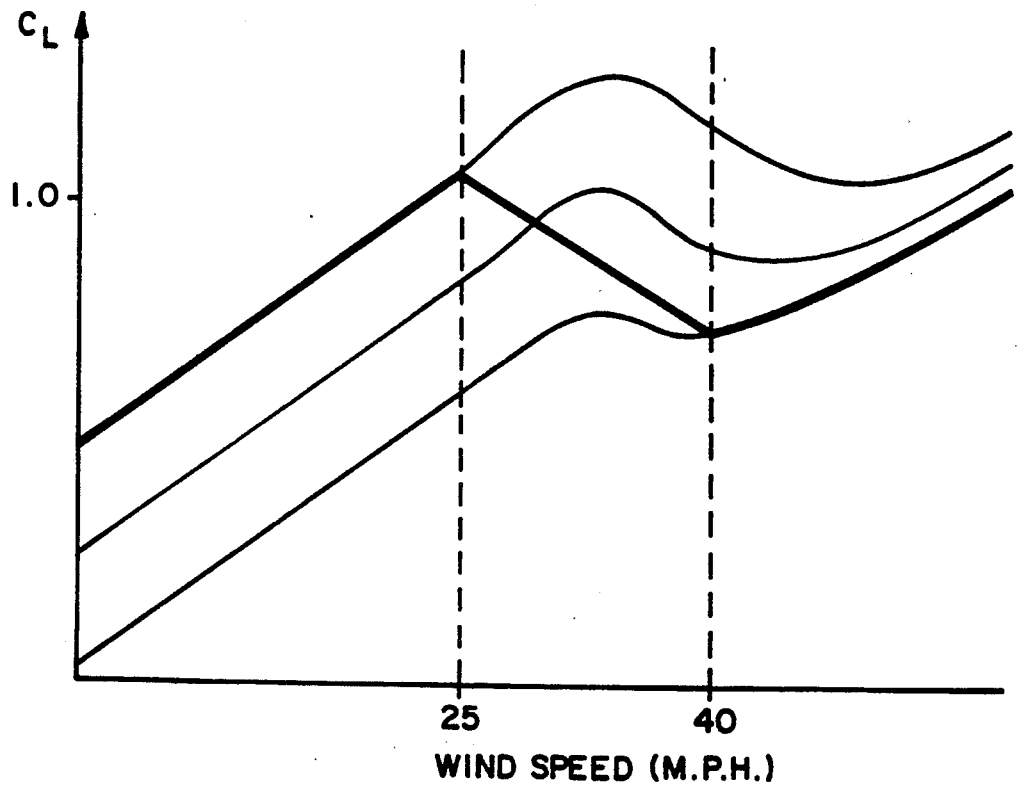
FIG. 20 is a graph comparing wind speed to lift coefficient for a blade with an aileron at several angles of deployment.

Without aileron adjustment, the lift coefficient increases as the wind speed increases. FIG. 20 shows three graphs of lift coefficients versus wind speed for aileron deployment angles of 0°, −5°, and −15°. For deployment of 0°, the lift coefficient is greater at all speeds than it is when the aileron is deployed to −15°. Under the control described above, for lower wind speed, the aileron is maintained at 0°, but is deployed to a negative angle when the wind speed exceeds 25 m.p.h. As the graphs show, with this adjustment, the controller can reduce the lift coefficient.

What is claimed is:

1. A wind turbine comprising:
    a rotor with at least one elongated blade with leading and trailing edges;
    an aileron pivotally mounted to the trailing edge of said blade;
    a hinge arm rigidly connected to the blade;
    an actuator assembly connected to the blade, said actuator assembly having a movable actuator arm for adjusting the angular position of the aileron, without translation, relative to said blade; and
    at least one hinge body rigidly mounted to the aileron for coupling said aileron to said blade;
    means for pivotally connecting said hinge arm to said hinge body; and
    means for connecting one end of the actuator arm to said hinge body.

2. The wind turbine of claim 1 wherein said hinge body has two side walls and a cavity, and wherein each of said connecting means includes a trunnion extending from one side wall to another side wall.

3. The wind turbine of claim 1 wherein said hinge body has two side walls and a central wall defining two cavities, wherein each of said connecting means includes a trunnion, each extending from the central wall to a different side wall.

4. The wind turbine of claim 1 wherein said hinge body comprises a plate and includes two trunnions, each mounted to the same side of the plate.

5. The wind turbine of claim 1 wherein said actuator assembly is a linear actuator.

6. The wind turbine of claim 1 wherein the actuator assembly comprises:
    an actuator linkage extending lengthwise along a portion of said blade; and
    an aileron linkage coupled to said hinge, said aileron linkage and said actuator linkage approximately perpendicular to each other.

7. The wind turbine of claim 6, wherein said blade has a substantially flat lower surface approximately planar over the length of said aileron, said aileron being pivotable via said hinge body about an axis parallel to the length of said blade and substantially parallel to the plane of the lower surface, further comprising a bell crank lying in a plane parallel to said lower surface pivotally mounted to said blade for rotation on an axis perpendicular to the plane of said lower surface, and coupled to said actuator linkage and said aileron linkage.

8. The wind turbine of claim 6 wherein said hinge comprises a plate mounted to said aileron, and wherein each of said connecting means includes a trunnion mounted to the same side of the plate.

9. The wind turbine of claim 1 wherein said actuator assembly comprises a threaded shaft coupled to said blade and to said hinge.

10. The wind turbine of claim 9 wherein said actuator assembly further comprises a block with a threaded bore which is coupled to said hinge, said threaded shaft turning within said threaded bore.

11. The wind turbine of claim 9 wherein said threaded shaft is coupled to a rotational drive mechanism mounted to said blade.

12. The wind turbine of claim 9 wherein said hinge has two side walls and a cavity, and wherein each of said connecting means includes a trunnion extending from one side wall to another side wall.

13. The wind turbine of claim 9 wherein said hinge has two side walls and a central wall defining two cavities, wherein each of said connecting means includes a trunnion, each extending from the central wall to a different side wall.

14. The wind turbine of claim 1 wherein said actuator assembly is pivotally mounted external to the blade.

15. A wind turbine comprising:
a rotor having at least one blade with a leading edge and a trailing edge;
an aileron mounted to said blade for rotation, without translation, about a hinge axis, said hinge axis located between top and bottom surfaces of said aileron, said aileron having a leading edge facing the trailing edge of the outer portion of the rotor blade, said leading edge of the aileron having at least one portion extending over substantially the entire length of the aileron which mates with a mating portion of said blade in a manner such that the aileron vents air from one said of said blade to an opposite side of said blade when said aileron is rotated to angular positions beyond a range of angular positions, thereby reducing the blade's coefficient of lift, and said aileron does not vent air when actuated to angular positions within said range of angular positions.

16. The wind turbine of claim 15 wherein said aileron has two curved portions in the leading edge, one near the top surface of the aileron and one near the bottom surface, the center of curvature for each curved portion lying on the hinge axis, both curved portions extending substantially the entire length of the aileron, said curved portions having different radii of curvature.

17. The wind turbine of claim 16 wherein the curved portion having the greater radius of curvature subtends an arc of about 15°.

18. The wind turbine of claim 15 wherein said aileron has two arc portions, each of which mates with a corresponding mating portion of the blade, said arc portions designed so that each arc portion separates from said mating portions when said aileron is actuated to an angle outside said range of angles.

19. A wind turbine comprising:
a rotor having at least one blade, said rotor rotating at a frequency;
an aileron mounted to the blade for rotation, without translation, about a hinge axis;
a cyclic actuator coupled to the blade and the aileron for cyclically adjusting the angular position of said aileron, relative to said blade, at the same frequency as the rotation of the rotor.

20. The wind turbine of claim 19 wherein said cyclic actuator comprises an actuator arm coupled to the aileron and to an eccentric drive mechanism which is coupled to the blade.

21. The wind turbine of claim 19 wherein said cyclic actuator comprises a reciprocal driving mechanism.

22. The wind turbine of claim 21 wherein said reciprocal mechanism comprises a wheel which is coupled to a motor for driving the wheel at the same frequency as the rotor.

23. The wind turbine of claim 21 wherein said cyclic actuator further comprises a threaded screw coupled to said reciprocal driving mechanism.

24. The wind turbine of claim 23 wherein said cyclic actuator further comprises a nut coupled to the aileron, said nut having a threaded bore, said threaded shaft turning within said threaded bore.

25. The wind turbine of claim 19 wherein said cyclic actuator comprises a motor for cyclically adjusting the angular position of said aileron.

26. The wind turbine of claim 19 wherein said rotor has a second blade positioned 180° opposite from said one blade, further comprising:
a second aileron mounted to said second blade for rotation, without translation, about a hinge axis; and
a second cyclic actuator coupled to said second blade and said second aileron for continuously adjusting the angular position of said second aileron, relative to said second blade, at the same frequency as the rotation of the rotor.

27. The wind turbine of claim 26 wherein said cyclic actuator and said second cyclic actuator adjust said aileron and said second aileron, respectively, to equal angular positions when the blades are at rotational angles of 90° and 270° with respect to the vertical position.

28. The wind turbine of claim 26 wherein said cyclic actuator and said second cyclic actuator adjust said aileron and said second aileron, respectively, to angular positions having values which are furthest apart when the blades are at rotational angles of 0° and 180° with respect to the vertical position.

29. A method for operating a wind turbine, said turbine having a rotor with at least one blade, an aileron being pivotally mounted to the blade and actuable by a cyclic actuator which changes the angular position of the aileron, relative to said blade, continuously with respect to the azimuthal position of the blade, said method comprising:
with a controller,
i) measuring the azimuthal position of said blade;
ii) causing adjustment of the cyclic actuator to a position based upon said azimuthal position; and
iii) causing said cyclic actuator to adjust the angular position of the aileron as the rotor rotates.

30. The method of claim 29 wherein causing adjustment of said cyclic actuator comprises activating a motor coupled to said cyclic actuator.

31. The method of claim 29 further comprising:
with said controller, monitoring loading on the blade; and
continuing or terminating cyclic actuation based upon the monitored loading.

32. The method of claim 29 wherein said rotor comprises a second blade which has a second aileron which is actuated by a second cyclic actuator, said method further comprising actuating said second cyclic actuator to adjust the position of said second aileron with a predetermined phase relationship.

33. A method for controlling a wind turbine having a rotor with a blade, an aileron pivotally coupled to said blade, and an actuator assembly for adjusting the angular position of the aileron relative to the blade, said rotor rotating under the influence of wind blowing at a wind speed, said method comprising the steps:
i) defining a first regime comprising wind speeds less than or equal to a lower threshold wind speed;
ii) defining a second regime comprising wind speeds greater than or equal to an upper threshold wind speed, said upper threshold wind speed being greater than said lower threshold wind speed;
iii) actuating said aileron to a lower bound angular position when said wind turbine is rotating under the influence of wind blowing at a wind speed which is within said first regime; and
iv) actuating said aileron to an upper bound angular position when said wind turbine is rotating under the influence of wind blowing at a wind speed which is within said second regime.

34. The method of claim 33, further comprising the steps of defining a third regime, said third regime comprising wind speeds between said lower threshold wind speed and said upper threshold wind speed; and
actuating said aileron to angular positions between said lower bound angular position and said upper bound angular position when said wind turbine is rotating under the influence of wind blowing at a wind speed which is within said third regime.

35. The method of claim 33 wherein said lower bound angle is about 0° and said upper bond angle has an absolute value of about 15°.

* * * * *

UNITED STATES PATENT AND TRADEMARK OFFICE
CERTIFICATE OF CORRECTION

PATENT NO.  : 5,320,491

DATED       : June 14, 1994

INVENTOR(S) : Clint Coleman et al.

It is certified that error appears in the above-identified patent and that said Letters Patent is hereby corrected as shown below:

On The Title Page:

Item [56], References Cited after FOREIGN PATENT DOCUMENTS, add OTHER PUBLICATIONS Snyder, M. H. et al., "Additional Reflection Plane Tests of Control Devices on an NACA 23024 Airfoil", Wind Energy Report No. 26, Wichita State University, Feb. 1985, pp. 1-44.

Miller et al., "Shutdown Characteristics of the Mod-O Wind Turbine with Aileron Controls", NASA, Lewis Research Center, DOE NASA/20320-61, NASA TM-8691, Cleveland, OH, May, 1984.

Snyder et al., "Reflection Plane Test of Control Devices on a Thick Airfoil at High Angles of Attack", Wind Energy Report No. 23 revised, Lewis Research Center, Oct. 1984.

Corrigan et al., "Performance Tests on the Mod-O Wind Turbine with Aileron Control Surfaces", NASA Wind Energy Project Office, Lewis Research Center, Cleveland, OH, May 8, 1984.

Cao et al., "Performance and Aerodynamic Braking of a Horizontal-Axis Wind Turbine from Small-Scale Wind Tunnel Tests", NASA Lewis Research Center, July, 1987.

Savino et al., "Reflection Plane Tests of a Wind Turbine Blade Tip Section with Ailerons", NASA, Langley Research Center, Hampton, VA, Aug. 1985.

UNITED STATES PATENT AND TRADEMARK OFFICE
CERTIFICATE OF CORRECTION

PATENT NO. : 5,320,491

DATED : June 14, 1994

INVENTOR(S) : Clint Coleman et al.

It is certified that error appears in the above-identified patent and that said Letters Patent is hereby corrected as shown below:

Miller et al., "Summary of NASA/DOE Aileron-Control Development Program for Wind Turbines", NASA Lewis Research Center, Cleveland, OH pp. 537-545.

Gregorek et al., "Comparison of Pressure Distributions on Model and Full-Scale NACA 64-621 Airfoils with Ailerons for Wind Turbine Application", NASA, Lewis Research Center, Apr. 1988.

Miller et al., "Aileron Controls for Wind Turbine Applications", NASA, Lewis Research Center, Aug., 1984.

Miller et al., "Brake Augmented Shutdown Analysis of the Mod-O with a 38% Chord Aileron-Control Rotor", NASA, Lewis Research Center, Cleveland, OH, Mar. 27, 1985.

Miller et al., "Analytical Model for Predicting Emergency Shutdown of a Two-Bladed Horizontal Axis Wind Turbine", NASA, Lewis Research Center, June, 1983.

Wentz et al., "Feasibility Study of Aileron and Spoiler Control Systems for Large Horizontal Axis Wind Turbines", NASA, Lewis Research Center, May 1980.

Wentz et al., "Wind Tunnel Tests of Spoilers and Ailerons for Wind Turbine Power Control and Braking", Sandia Wind Turbine Aerodynamics Seminar, Mar. 1985.

UNITED STATES PATENT AND TRADEMARK OFFICE
CERTIFICATE OF CORRECTION

PATENT NO. : 5,320,491

DATED : June 14, 1994

INVENTOR(S) : Clint Coleman et al.

It is certified that error appears in the above-identified patent and that said Letters Patent is hereby corrected as shown below:

Cao et al., "Performance and Aerodynamic Braking of a Horizontal-Axis Wind Turbine from Small-Scale Wind Tunnel Tests", Wind Energy Report No. 37, NASA, Lewis Research Center, July, 1985.

Miller et al., "Summary of 38 Percent Chord Aileron-Control Rotor Tests", NASA, Lewis Research Center, Fourth ASME, 1985.

Miller et al., "Analytical Model for Predicting Emergency Shutdown of a Two-Bladed Horizontal Axis Wind Turbine", NASA, Lewis Research Center, Sixth Biennial Wind Energy Conference and Workshop, pp. 803-813.

Brocklehurst, "Aerodynamic Control of Horizontal Axis Wind", BWEA, 1988, pp. 173-179.

Column 7, line 63, "0°--5°" should be --0°-5°--.
Column 9, line 48, "one said" should be --one side--.
Column 9, line 50, "beyond" should be --outside--.
Column 12, line 21, claim 35, "bond" should be --bound--.

Signed and Sealed this

Eighth Day of October, 1996

BRUCE LEHMAN

Attest:

Attesting Officer

Commissioner of Patents and Trademarks